United States Patent [19]

Jae-chon

[11] Patent Number: 5,650,817
[45] Date of Patent: Jul. 22, 1997

[54] IMAGE AREA INDICATING CIRCUIT OF A CAMERA

[75] Inventor: Lhyu Jae-chon, Seoul, Rep. of Korea

[73] Assignee: Samsung Electronics Co., Ltd., Kyungki-do, Rep. of Korea

[21] Appl. No.: 913,428

[22] Filed: Jul. 15, 1992

[30] Foreign Application Priority Data

Jul. 15, 1991 [KR] Rep. of Korea ............... 91-12324

[51] Int. Cl.$^6$ .................................................. H04N 5/225
[52] U.S. Cl. ........................................... 348/207; 348/358
[58] Field of Search ................................ 358/209, 909, 358/93, 110, 210; 352/131; 348/207, 358, 370

[56] References Cited

U.S. PATENT DOCUMENTS

| | | | |
|---|---|---|---|
| 2,816,475 | 12/1957 | Waller et al. | 352/48 |
| 4,916,579 | 4/1990 | Simms | 362/18 |
| 5,056,097 | 10/1991 | Meyers | 372/38 |
| 5,059,019 | 10/1991 | McCullough | 352/131 |
| 5,073,824 | 12/1991 | Vertin | 358/209 |

*Primary Examiner*—Wendy Garber
*Attorney, Agent, or Firm*—Sughrue, Mion, Zinn, Macpeak & Seas

[57] ABSTRACT

A camera, such as a video camera, for photographing or recording an object onto a recording medium including an image area indicating circuit. The image area indicating circuit includes a laser beam generator for generating laser beams, a reflector for reflecting the laser beams to define a photographing area which includes the object to be photographed, and a controller for controlling the angle of reflection of the laser beams reflected by the laser beam reflector in accordance with the camera's degree of zoom.

7 Claims, 2 Drawing Sheets

IMAGE AREA INDICATING CIRCUIT OF A CAMERA

BACKGROUND OF THE INVENTION

The present invention relates to a video camera, such as a camcorder, for photographing or recording a picture image onto a recording medium. More particularly, the invention relates to an image area indicating circuit, which generates laser beams, for defining a photographing area of an object to be photographed.

In conventional cameras, functions such as focusing and zooming require the user to view the object through a viewfinder of the camera and actuate manual controls for effecting such functions.

More recently, the focusing function, for example, has become automated through an automatic focusing device. As a result, the user does not have to view the object through the viewfinder and manually adjust the focusing controls to focus the camera onto an object.

On the other hand, with respect to the zooming function, the user is required to view the object to be photographed through the viewfinder and manually control the zooming conditions of the camera relative to the object.

Accordingly, in order to photograph an object with a camcorder and to control accurately the zoom function of the camcorder, the user has to look into the viewfinder to visualize the object as the zoom settings are manually adjusted.

However, when the user is photographing a moving object, there are problems associated with the above described zooming method which make photographing an object both difficult and inaccurate because of the weight of the camcorder. Further, since the user cannot visualize the surrounding conditions or area of the object to be photographed, a good picture (including the background) cannot be obtained. This is particularly true when photographing in the night because it is difficult to follow an object and to identify the surrounding conditions of the object at the same time.

SUMMARY OF THE INVENTION

Accordingly, it is an object of the present invention to provide a circuit within a camera, such as a camcorder, in which laser beams are emitted to define an area of an object to be photographed without requiring the user to view the object through the viewfinder.

It is also an object of the present invention to provide a circuit in which the area defining the object to be photographed varies corresponding to changes in the zooming conditions.

The above and other objects of the invention are accomplished by an image area indicating circuit of a camera including a viewfinder, including a laser beam generator for generating laser beams, a laser beam reflector for reflecting the laser beams to define a photographing area which includes an object to be photographed, a laser beam reflection-angle controller for controlling the angle of reflection of the laser beams reflected by the laser beam reflector to adjust the size of the photographing area, wherein the object can be photographed without a user having to view the object through the viewfinder of the camera.

The above and other objects, features and advantages of the present invention will be apparent from the following description taken with reference to the accompanying drawings.

DETAILED DESCRIPTION OF THE PREFERRED EMBODIMENTS

Hereinafter, a preferred embodiment of the present invention is described with reference to the accompanying drawings.

Figure 1:
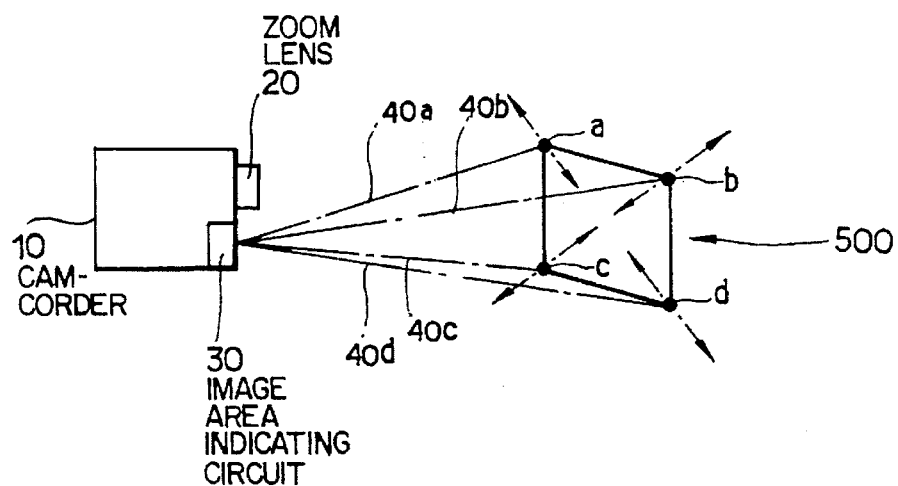
FIG. 1 illustrates an image area indicating circuit of a camera in accordance with the present invention.

Referring the FIG. 1, there is shown a camcorder 10, a zoom lens 20, and an image area indicating circuit 30, which generates laser beams to define an area to be photographed in accordance with the present invention. The image area indicating circuit 30 is disposed at a bottom, front side of the camcorder 10, but it should be understood that the image area indicating circuit may be disposed anywhere on the camcorder 10 so that a laser beam can be irradiated forwardly.

Reference numerals 40a, 40b, 40c and 40d denote the laser beams, which are generated by the image area indicating circuit 30. The laser beams 40a–d are of a predetermined color, respectively, and are of a strength that is not harmful to the human body. The laser beams 40a–d are irradiated onto a subject or object in the vicinity of the area to be photographed. Accordingly, images a, b, c, and d are formed on the subject thus defining a photographing (image) area 500. The photographing area 500 constitutes a boundary of a picture image which is to be photographed. In this case, the photographing area is larger than the picture image to be actually photographed so that the images a, b, c, and d are not photographed.

The images a, b, c and d can be moved by a zoom key 300 (FIG. 2) of the camcorder 10 in directions indicated by the arrows to increase or decrease the size of the photographing area 500.

Figure 2:
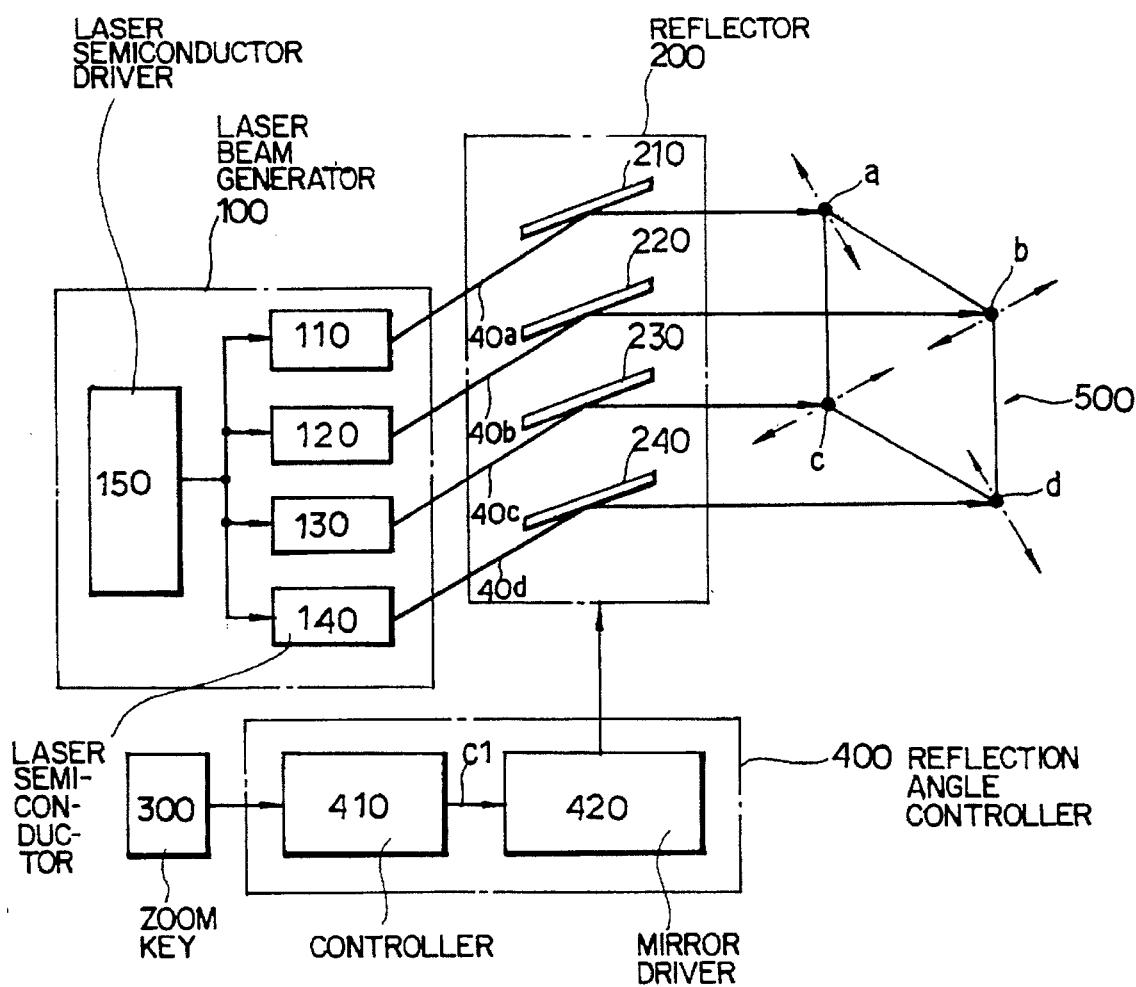
FIG. 2 is a detailed block diagram of the image area indicating circuit according to the present invention.

FIG. 2 shows a detailed block diagram of the image area indicating circuit 30, which includes a laser beam generator 100 for generating the laser beams which define the photographing area 500, a laser beam reflector 200 for reflecting the laser beams generated by the laser beam generator 100, a zoom key 300 for controlling the zooming conditions of the camera or the size of the photographing area 500, and a laser beam reflection-angle controller 400, which in response to the zoom key 300, controls the reflection angle of the laser beam reflector 200 to vary the angle of reflection of the laser beams and thus control the size of the photographing area 500.

The laser beam generator 100 includes a plurality of laser semiconductors 110, 120, 130, and 140 for respectively generating the laser beams 40a, 40b, 40c, and 40d and a laser semiconductor driver means 150 for driving the laser semiconductors 110, 120, 130, and 140. The laser beam reflector 200 includes a plurality of mirrors 210, 220, 230, and 240 for respectively reflecting and irradiating the laser beams 40a, 40b, 40c, and 40d generated by the laser beam generator 100 toward the area to be photographed. The laser beam reflection-angle controller 400 includes a controller 410 for outputting a control signal C1 corresponding to the zooming conditions set by the zoom key 300, and a mirror driving device 420 for controlling the angle of the mirrors 210, 220, 230, and 240 in accordance with the control signal C1 outputted from the controller 410 so as to control the angle of reflection of the laser beams 40a–d.

In operation, when power is supplied to the image area indicating circuit, the semiconductor driver 150 drives the laser semiconductors 110, 120, 130, and 140 to generate the laser beams 40a–d. The laser beams 40a–d are respectively reflected by the mirrors 210, 220, 230, and 240 of the laser beam reflector 200 and irradiated onto the subject thereby defining the photographing area 500. That is, the laser beams 40a, 40b, 40c and 40d reflected from the mirrors 210, 220, 230 and 240 are projected onto the subject positioned in the vicinity of the object to form the images a, b, c, and d so as to define the photographing area 500.

As a result, the user can determine with accuracy the location of the object to photographed by viewing the photographing area 500 without looking into a viewfinder. Moreover, the present zoom condition can also be identified based on the size of the photographing area 500 defined by the images a, b, c, and d. If a subject, upon which the images can be formed, is not present in the vicinity of the area to be photographed, the images will generally be formed at the lower side (e.g., ground) of the object. Thus, the photographing area can still be identified.

Meanwhile, through the manual operation of the zoom key 300, the controller 410 of the laser beam reflection-angle controller 400 determines the degree of zoom and outputs a control signal C1 in response thereto to the mirror driving device 420. The mirror driving device 420 controls the angle of the mirrors 210, 220, 230, and 240 of the laser beam reflector 200 in accordance with the control signal C1 to control the angle of reflection of the laser beams 40a–d. As a result, the laser beams 40a–d are reflected by the mirrors 210, 220, 230, and 240 thus forming the images a, b, c, and d, onto the object.

As the zoom key is adjusted to increase or decrease the zooming factor, the images a-d move in the directions indicated by the arrows so that the photographing area 500 is correspondingly increased or decreased. More specifically, when the zooming condition is adjusted by the zoom key 300 to ZOOM OUT, the photographing area 500 is enlarged. On the other hand, when the zooming condition is set to ZOOM IN, the photographing area 500 is reduced.

As mentioned above, the object to be photographed can be automatically focused so as the user adjusts the zooming conditions, the object to be photographed remains in focus. Furthermore, since the laser beams employed are not harmful to the human body, the laser beams have unlimited use in connection with a camera. In addition, because the beams irradiated are of a predetermined color, the camera according to the present invention can be used in a dark place. The laser beams can also be viewed under glaring sunlight.

Figure 3:
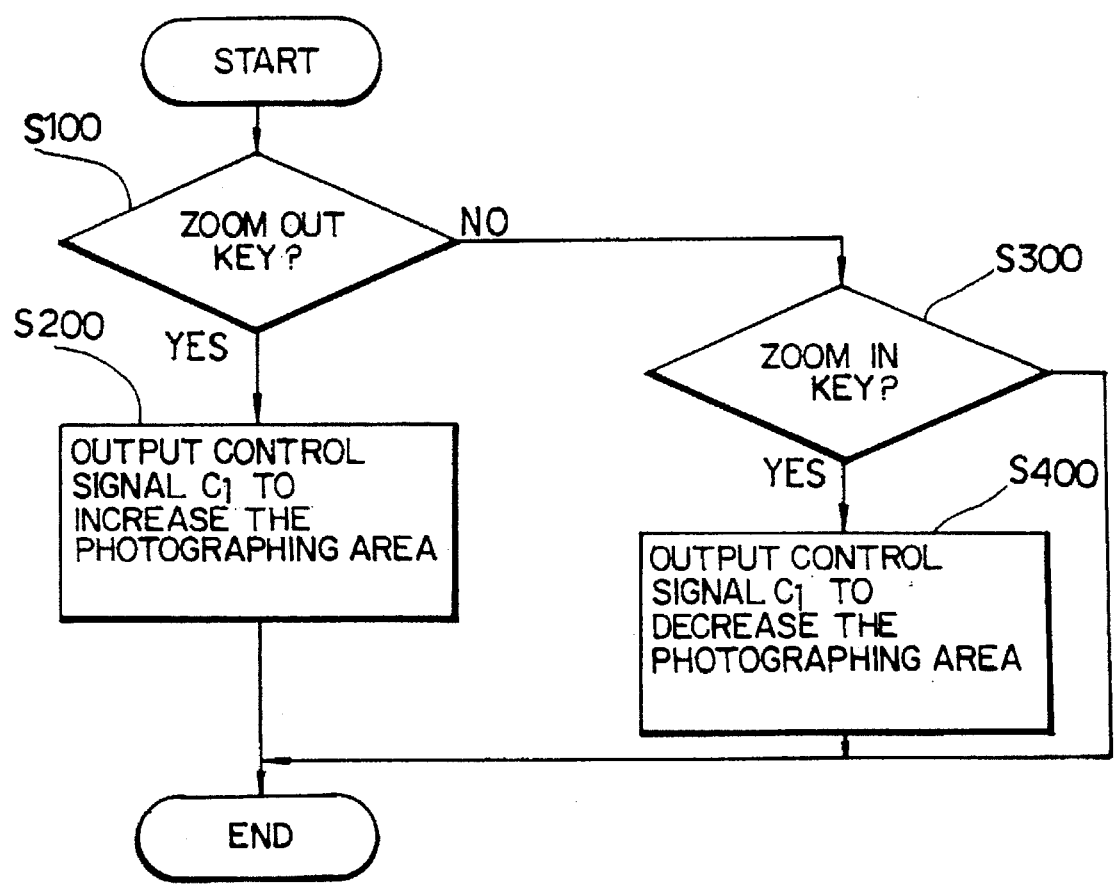
FIG. 3 is a flowchart illustrating an operation of the image area indicating circuit according to the present invention.

Referring to FIG. 3, there is shown a flowchart illustrating an operation of the controller 410 when the zoom key 300 is activated.

When the key input signal is entered into the controller 410 in response to the operation of the zoom key 300, the controller 410 determines whether the key input signal activated represents a ZOOM OUT key in step S100. If the ZOOM OUT key is activated then the controller 410 outputs the control signal C1 to the mirror driving device 420 to increase the photographing area, in step S200. Alternatively, if in step S300, it is determined that the ZOOM IN key is being activated, then the controller 410 outputs the control signal C1 to the mirror driving device 420 so that the photographing area 500 is decreased in step S400.

Accordingly, the mirror driving device 420 controls the angle of the mirrors 210, 220, 230 and 240 of the laser beam reflector 200 in accordance with the control signal C1 to adjust the size of the photographing area.

There has thus been shown and described a novel apparatus for accurately photographing an object while variously adjusting the zooming conditions without requiring the user to view the object through the viewfinder which fulfills all the objects and advantages sought therefor. Many changes, modifications, variations, and other uses and applications of the subject invention will, however, become apparent to those skilled in the art after considering the specification and the accompanying drawings which disclose preferred embodiments thereof. All such changes, modifications, variations, and other uses and applications which do not depart from the spirit and scope of the invention are deemed to be covered by the invention which is limited only by the claims which follow.

What is claimed is:

1. An image indicating circuit of a camera including a viewfinder, comprising:

a laser beam generator for generating laser beams;

a laser beam reflector for reflecting said laser beams to define a photographing area which includes an object to be photographed;

a zoom key for controlling a degree of zoom; and a laser beam reflection-angle controller for automatically controlling the angle of reflection of said laser beams reflected by said laser beam reflector to simultaneously adjust the height and width of said photographing area, wherein said object can be photographed without a user having to view said object through the viewfinder of the camera and wherein said laser beam reflection-angle controller comprises means, responsive to the zoom key, for simultaneously controlling the angle of reflection of said laser beams reflected by said laser beam reflector corresponding to the degree of zoom.

2. An image area indicating circuit as defined in claim 1, wherein said laser beam generator comprises a plurality of laser semiconductors for generating said laser beams and a laser semiconductor driver for driving said laser semiconductors.

3. An image area indicating circuit as defined in claim 2, wherein said laser beam reflector comprises a plurality of mirrors for respectively reflecting the plurality of laser beams generated by said laser beam generator.

4. An image area indicating circuit as defined in claim 1, wherein said laser beam reflector comprises a plurality of mirrors for reflecting said laser beams generated by said laser beam generator.

5. An image area indicating circuit as defined in claim 1, wherein said laser beam reflection-angle controller comprises a controller for outputting a control signal representative of the degree of zoom, and a mirror driving device, responsive to said control signal, for controlling the angle of reflection of said laser beams reflected by said laser beam reflector.

6. An image indicating circuit as defined in claim 1, wherein said laser beams define four corners of said photographing area.

7. An image indicating circuit as defined in claim 2, wherein each of said laser semiconductors corresponds directly to a single projected laser beam.

* * * * *

UNITED STATES PATENT AND TRADEMARK OFFICE
CERTIFICATE OF CORRECTION

PATENT NO. : 5,650,817
APPLICATION NO. : 07/913428
DATED : July 22, 1997
INVENTOR(S) : Jae-chon Lhyu It is certified that error appears in the above-identified patent and that said Letters Patent is hereby corrected as shown below:

Inventor: Title page, item [75] should read as follows: ~~Lhyu~~ Jae-chon <u>Lhyu</u>, Seoul, Rep. of Korea Signed and Sealed this Third Day of June, 2008

JON W. DUDAS
*Director of the United States Patent and Trademark Office*